(12) United States Patent
Choi

(10) Patent No.: US 7,255,487 B1
(45) Date of Patent: Aug. 14, 2007

(54) SIMPLE FIBER OPTIC PACKAGED FILTER

(76) Inventor: Youngmin A. Choi, 5410 Isabella Ct., Agoura Hills, CA (US) 91301

( * ) Notice: Subject to any disclaimer, the term of this patent is extended or adjusted under 35 U.S.C. 154(b) by 0 days.

(21) Appl. No.: 11/585,032

(22) Filed: Oct. 24, 2006

(51) Int. Cl.
*G02B 6/38* (2006.01)

(52) U.S. Cl. .......................................... 385/73; 385/72

(58) Field of Classification Search ................ 385/27, 385/31, 50, 72, 73; 356/352
See application file for complete search history.

(56) References Cited

U.S. PATENT DOCUMENTS

| | | | |
|---|---|---|---|
| 5,062,684 A * | 11/1991 | Clayton et al. .............. 385/27 |
| 5,073,004 A * | 12/1991 | Clayton et al. .............. 385/27 |
| 5,208,886 A * | 5/1993 | Clayton et al. .............. 385/73 |
| 5,212,746 A * | 5/1993 | Miller et al. ................. 385/25 |
| 5,289,552 A * | 2/1994 | Miller et al. ................. 385/73 |

* cited by examiner

*Primary Examiner*—Quyen P Leung

(57) ABSTRACT

A novel Fabry-Perot resonance cavity has been recognized with ruggedized packaging. This cavity is formed by simple planar and concave (or two concave) mirrors—attached at the fiber ends. The concave mirror is precisely aligned to the core of the fiber. The concave lens is fabricated on the end of the fiber by making an indentation of correct geometry and smoothness. The concave mirror has multiple dielectric layers applied on the concave lens to achieve the final, desired optical characteristics. This structure is packaged using novel techniques from which it derives great utility. The resulting packaged assembly is environmentally robust and capable of operating at very high frequencies with low input voltages.

3 Claims, 2 Drawing Sheets

SIMPLE FIBER OPTIC PACKAGED FILTER

REFERENCE

U.S. Pat. No. 5,289,552 May 1993 Miller, et al., "Temperature compensated fiber fabry-perot filters"

Miller et al., "Passively temperature compensated fiber fabry-perot filter . . . " Electron Lett., 1990 Vol. 26, pp. 2122-2123

FIELD OF THE INVENTION

The present invention relates generally to the assembly of a simple rugged resonance cavity. This assembly is very much simplified over prior art, is inherently stable, is capable of operating at very high frequencies, uses a very low driving voltage and performs in harsh environments. This performance achieved through key features of the packaging and part design. This construction is significantly simpler and more reliable than that used in the prior art.

BACKGROUND OF THE INVENTION

The main problems with conventional optical resonance cavities are their complexity, reliability, and instability. In addition, they are limited to the frequency they operate at and require high voltage to operate them. These devices are not easily built and much less reliable since they consist of a plethora of devices such as complex manufacturing steps, complex alignment fixtures and multiple parts requiring precision alignment. In addition, properly aligning the parts can be difficult and time-consuming, resulting in a complex, less reliable, and expensive resonance cavity. The assembly of such devices is lengthy and problematic requiring complicated alignment and holding fixtures for the mirrors. FIG. 1 is an example of the construction prevalent to date. FIGS. 1 and 2 show the complex structure, precision alignments and alignment tooling needed to achieve a cavity. In these respects, the simple resonance cavity according to the present invention substantially departs from the conventional concepts and designs of the prior art, and in so doing, provide an apparatus primarily developed for providing a cavity which can be tuned and is packaged in an environmentally rugged way. This simplification of design and packaging benefits results in a novel construction with the attributes herein listed and subsequently described. FIGS. 3 and 4 show an inherently much simpler structure that has multiple benefits including inherent temperature compensation, very high frequency operation (>150 kHz), low voltage operation (~1.5 volt/FSR) at resonance mode and is environmentally rugged.

SUMMARY OF THE INVENTION

In view of the foregoing disadvantages inherent in the known types of optical cavities now present in the prior art, the present invention provides a simple resonance cavity construction and packaging.

The general purpose of the present invention, which will be described subsequently in greater detail, is to provide a simple assembly that allows the generation and control of an optical resonance cavity using a packaging concept that greatly improves the performance. This packaged assembly has many advantages over prior art and many novel features that result in a very simple assembly that is rendered obvious in it's improvement over prior art.

BRIEF DESCRIPTION OF THE DRAWINGS

Various objects, features, and attendant advantages of the present invention can be fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
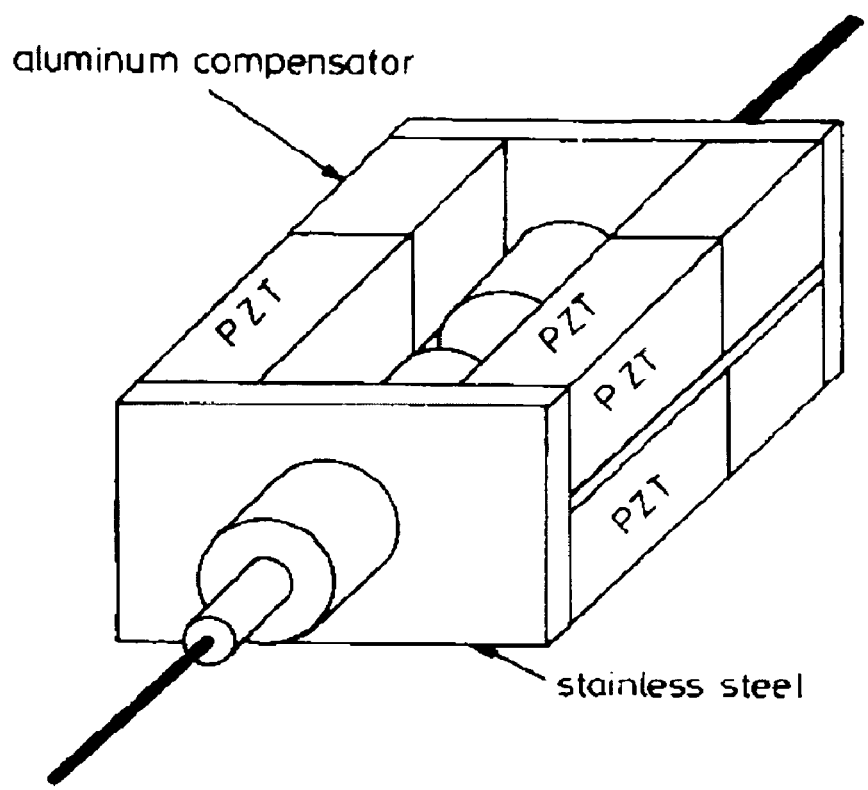
FIG. 1 is a view of prior art showing the complexity inherent therein.

Turning now descriptively to the drawings, in which similar reference characters denote similar elements throughout the several views, the attached figures illustrate assemblies that form and control novel cavities with optical fibers and two mirrors.

Figure 2:
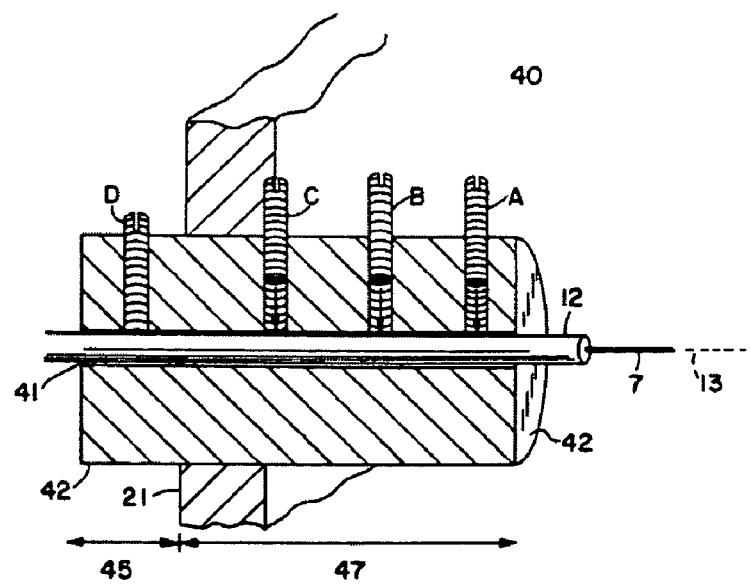
FIG. 2 is a view of prior art showing the complexity inherent therein.
Figure 3:
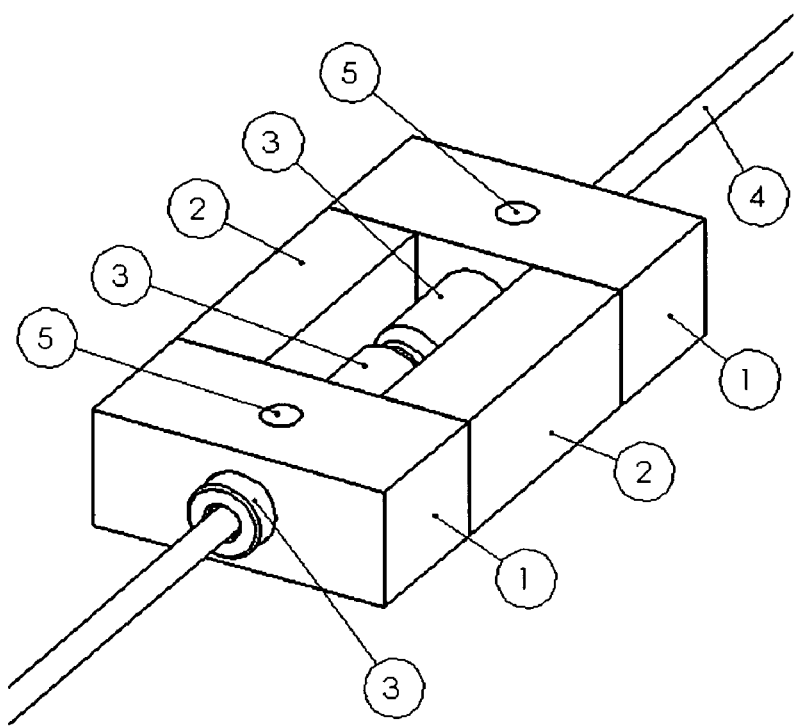
FIG. 3 is a schematic view of the current art showing inherent simplicity.
Figure 4:
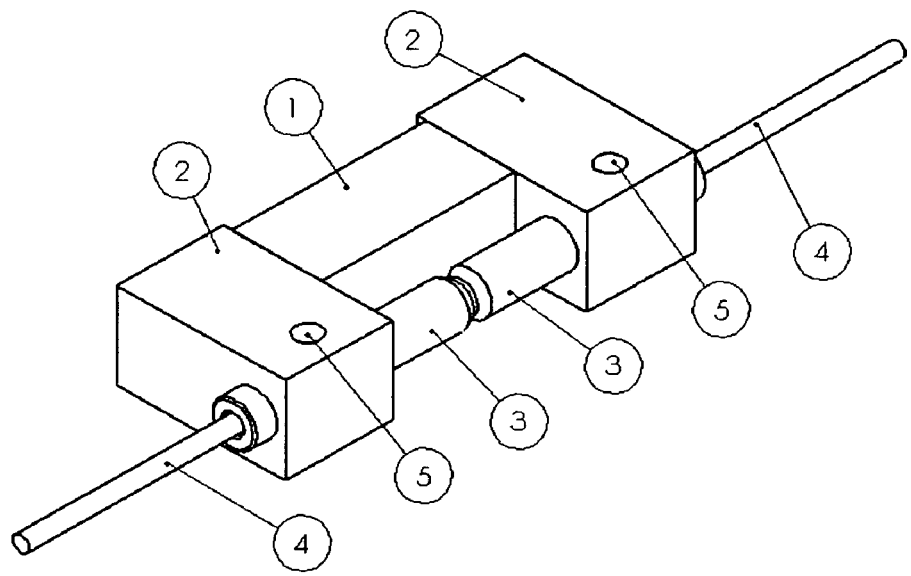
FIG. 4 is a schematic view of the current art showing the simplest functional configuration.

FIGS. 1 and 2 show prior art. These assemblies have multiple parts which are used to compensate for temperature effects and for achieving alignment of the key elements forming the cavity. FIG. 1 shows the use of 4 piezoelectric elements along with 4 compensator blocks of aluminum. In addition there are several other parts that fully make up this assembly. All of these parts expand and contract differently over temperature. This results in unwanted movement of the optical cavity and hence degrade performance or even prevent operation completely. Further, detailed examination of FIG. 1 reveals a very complex and expensive structure to achieve a stable alignment. The aluminum compensator blocks are used to offset the different thermal expansion coefficients and, by precisely machining them to a specific length, can compensate in part for temperature differences. FIGS. 3 and 4 show a much simple structure that achieves improved performance. Many pieces are eliminated and assembly is simplified by using suitable tooling which guarantees alignment through the much simpler assembly process. Referring specifically to FIG. 3, the following parts are identified: (1) aluminum end plates, (2) piezoelectric transducers, (3) fiber ferrule, (4) optical fiber and (5) adhesive port. Adhesive joins exist between (1) and (2) and between (1) and (3). These adhesive joints are precisely and easily controlled by the use of simple tooling. FIG. 4 is an alternate embodiment that uses only one piezoelectric transducer, further reducing complexity and cost. All materials are thermally matched and do not require precision machining of any parts. This is achieved by the geometry of the design and is very robust. Final assembly of all parts is done using tooling which eliminates alignment errors and requires reduced skill to achieve desired performance. The resulting device uses the minimum number for parts possible. The final assembled and packaged configuration exhibits an equivalent thermal coefficient of linear expansion that is less than 0.5 nm/degC over a wide temperature range.

In addition, the device can be operated at the resonance points of the assembly which again by design is maintained very high. This is achieved by the inherent resonance of the individual piece parts like the piezoelectric elements and the aluminum blocks in addition to the design of the adhesive joints and the material properties of the adhesive selected.

This combination results in a very stiff and high resonance structure that has well defined and stable resonance peaks. Several resonance frequencies can be selected and operation >150 kHz is easily achievable with very low voltage. This provides additional flexibility for applications requiring very high speed applications.

Further, the entire filter assembly is encapsulated with the exception of the gap between (3) and (3). This maintains the operational characteristics of the optical cavity formed between (3) & (3) as well as supplying protection from the effects of moisture and debris. Encapsulation can be at the active region only or entirely within the external package. This provides substantial shock and vibration handling capability, moisture resistance and elimination of external contaminants. It should be noted that while the gap between (3) and (3) is currently gaseous, an alternate embodiment could have this gap filled with high index optical material. This would reduce the driving voltage of the current device further enhancing it's performance characteristics. This clearly has very beneficial advantages to packages of this type. The resulting assembly has now got several key features making it unique in that it is simple, temperature compensated, can operate at very high resonant frequency (>150 kHz), operates at low voltage (~1.5 volt/FSR) and is environmentally rugged.

What is claimed is:

1. A simple design structure, that is thermally matched, capable of holding thermally induced dimensional changes to near zero at a resonant cavity comprising:
   a) Two fiber ferrules that hold the fibers;
   b) Two aluminum end plates that are bonded to the fiber ferrule(s) and piezoelectric transducers that maintain alignment, structural rigidity and stability to the structure;
   c) Piezoelectric transducers that move the resonant cavity precisely and are structurally stable;
   d) Very thin, highly stable adhesive joints;
   e) Two adhesive access ports that permit the controlled, precise application of adhesive to the fiber ferrules;
   f) All materials and geometries specially selected to give the desired near zero thermal change.

2. A simple design structure capable of operating at very high frequency and at resonancies holding and changing a fiber optic resonant cavity with mirrors on the fiber ends comprising;
   a) Two fiber ferrules that hold the fibers;
   b) Two aluminum end plates that are bonded to the fiber ferrule(s) and piezoelectric transducers that maintain alignment, structural rigidity and stability to the structure;
   c) Piezoelectric transducers that move the resonant cavity precisely and are structurally stable;
   d) Two adhesive access ports that permit the controlled, precise application of adhesive to the fiber ferrules;
   e) Very thin, highly stable adhesive joints.

3. A simple encapsulated design structure capable of operating in high humidity, shock and vibration by virtue of the presence of a gel also comprising;
   a) Two fiber ferrules that hold the fibers;
   b) Two aluminum end plates that are bonded to the fiber ferrule(s) and piezoelectric transducers that maintain alignment, structural rigidity and stability to the structure;
   c) One or more piezoelectric transducer that move a resonant cavity precisely and are structurally stable;
   d) A package or housing that holds the structure;
   e) An encapsulant that acts as a moisture barrier;
   f) The gel has low elastic modulus which accommodated movement of the structure;
   g) The gel has low elastic modulus which provides internal damping to the structure;
   h) The resonant cavity can be filled with the high index optical gel to reduce the driving voltage.

* * * * *